United States Patent

Ishida et al.

[11] Patent Number: 5,967,934
[45] Date of Patent: Oct. 19, 1999

[54] PLANETARY TRANSMISSION WITH RELEASEABLE ONE WAY CLUTCH

[75] Inventors: Yosuke Ishida; Koichi Hashimoto; Hidenori Shimizu, all of Kadoma, Japan

[73] Assignee: Matsushita Electric Works, Ltd.

[21] Appl. No.: 09/016,931

[22] Filed: Feb. 2, 1998

Related U.S. Application Data

[63] Continuation of application No. 08/668,462, Jun. 25, 1996, abandoned.

[30] Foreign Application Priority Data

Jun. 27, 1995 [JP] Japan .................................. 7-184939

[51] Int. Cl.[6] ..................................................... F16M 3/44
[52] U.S. Cl. ........................... 475/269; 475/338; 475/341
[58] Field of Search ..................................... 475/269, 318, 475/331, 338, 341; 192/48, 92

[56] References Cited

U.S. PATENT DOCUMENTS

| | | |
|---|---|---|
| 1,499,763 | 7/1924 | Davis .................................. 475/338 X |
| 1,786,158 | 12/1930 | Hawes .................................. 475/338 X |
| 5,593,360 | 1/1997 | Ishida et al. ............................. 475/331 |
| 5,607,369 | 3/1997 | Yang .................................. 475/318 X |
| 5,711,739 | 1/1998 | Hashimoto et al. ................. 475/338 X |
| 5,728,022 | 3/1998 | Schultz .................................. 475/341 |

Primary Examiner—Khoi Q. Ta
Attorney, Agent, or Firm—Burns, Doane, Swecker & Mathis, L.L.P.

[57] ABSTRACT

A planetary transmission has a plurality of axially arranged planetary gear units each including sun gears, planet gears in mesh with the sun gears, and ring gears coaxial with the sun gears and in mesh with the planet gears, the arrangement being such that one of the ring gears in each planetary gear unit is blocked from being rotated while the other ring gear is made rotatable for allowing an output to be taken out, upon which the ring gear of which rotation is blocked is made selectable for changing over the reduction ratio, and a smooth bilateral change-over of speed change can be realized by executing the change-over between rotation-blocked and rotation-free states of the ring gear by means of a one-way clutch capable of releasing the rotation blocking.

5 Claims, 7 Drawing Sheets

PLANETARY TRANSMISSION WITH RELEASEABLE ONE WAY CLUTCH

This is a continuation of application Ser. No. 08/668,462 filed Jun. 25, 1996, now abandoned.

BACKGROUND OF THE INVENTION

This invention relates to a planetary transmission utilizing planetary gears, and the planetary transmission of the kind referred to can be effectively employed in, for example, motor-driven tools of which torque is made variable.

DESCRIPTION OF RELATED ART

There has been suggested as the planetary transmission an arrangement in which, in general, a plurality of the planetary gears or planetary gear units are disposed in axial direction so that an output of different transmission gear ratios can be obtained through a selective restriction of rotation of a plurality of members in these planetary gear units. In such planetary transmission, input and output shafts can be coaxially disposed and the reduction ratio obtainable with this arrangement can be made more compact than in any previous transmission, and this planetary transmission has been frequently employed in the motor-driven tools and the like. With the use of the above transmission, further, screw fastening or hole-making work by means of the motor-driven tool, for example, may be performed initially with a low-torque high-speed rotation and finally with a high-torque low-speed rotation in a simpler manner, so as to realize a high working efficient.

For the planetary transmission of the kind referred to, one has been disclosed in, for example, Japanese Patent Laid-Open Publication No. 63-101545, according to which the transmission comprises two sun gears disposed coaxial for integral rotation, two types of planet gears respectively in mesh with the sun gears, two types of ring gears respectively in mesh with each of the planet gears, a carrier supporting in common the respective planet gears, and a member for selectively blocking the rotation of the two types of the ring gears rotatable, wherein the rotation of either one of the ring gears is blocked by the blocking member for obtaining an output of different transmission gear ratios through the carrier. Another Japanese Patent Laid-Open Publication No. 63-186054 discloses an automatic transmission provided with means for blocking the rotation of the ring gears as moved in accordance with a load applied to the ring gears and for changing over the ring gears, so that a power will be automatically transmitted in accordance with the magnitude of the load without manual operation.

In the operation of the foregoing planetary transmissions, the output is obtained through the ring gear of which rotation is blocked and the planet gear in mesh with this ring gear blocked, whereas the ring gear of which rotation is not blocked is put in an idling state while the output is being obtained. In an event when the transmission or speed-change operation is carried out during the driving action, therefore, the rotation of the idling ring gear is to be forcibly stopped, that is, the ring gear has to be prevented from rotating by means of a rotation blocking member engaged to an engaging part provided to the ring gear in relationship to a setting of required force for blocking the rotation of the ring gear, so that there arises a problem that a collision occurring between the ring gear and the rotation blocking member brings about a noise or vibration and deteriorates the life of the ring gears and rotation blocking member.

In view of the above, there has been suggestion in which the ring gears is supported through a one-way clutch rendering the ring gear rotatable only in one direction so as to have the rotation of the ring gear blocked by means of this one-way clutch. In this case, the ring gear supported by the one-way clutch can be prevented from rotating by the clutch itself without engagement of the rotation blocking member, and there is involved no risk of any collision.

However, the other ring gear at the high-torque low-speed rotation side and not supported by the one-way clutch is still required to be changed over between rotating and non-rotating states, and there remains a problem that, when the ring gear in the rotatable state during the change-over, in particular, in the high-torque low-speed rotating state is to be returned to non-rotatable state with a locking member locked to the ring gear, the locking action of the locking means to the ring gear for resetting it to the low-torque high-speed rotating state cannot be executed in smooth manner.

SUMMARY OF THE INVENTION

The present invention has been suggested to overcome the foregoing problems, and is to provide, as a main object, a planetary transmission capable of effectively preventing any collision from occurring therein and, in addition, realizing in smooth manner a bilateral change over from the low-torque high-speed rotation to the high-torque low-speed rotation and from the high-torque low-speed rotation to the low-torque high-speed rotation during the speed change.

The above object can be realized according to the present invention by means of a planetary transmission comprising two sun gears mounted on a common input shaft for integral rotation therewith, two different types of planet gears respectively in mesh with each of said sun gears, two different types of rotatable ring gears respectively in mesh with each type of said planet gears, a carrier supporting commonly said two types of planet gears, and a member for blocking rotation of selective one of said two types of rotatable ring gears, an output being taken out through the other ring gear kept rotatable while the rotation of said selected one of the ring gears is blocked, and reduction ratios being changed over by the selection of one of the ring gears for blocking its rotation, characterized in that the ring gears are respectively supported through each of one-way clutches by a device body of the transmission, one of said one-way clutches which is interposed between the device body and one of the ring gears which is of a low reduction ratio and low-torque high-speed rotation being releasable in respect of rotation stopping.

Other objects and advantages of the present invention shall become clear as the description of the invention advances in the followings as detailed with reference to a preferred embodiment shown in accompanying drawings.

While the present invention shall now be described with reference to the embodiment shown in the accompanying drawings, it should be appreciated that the intention is not to limit the invention only to the embodiment shown but rather to include all alterations, modifications and equivalent arrangements possible within the scope of appended claims.

DETAILED DESCRIPTION OF THE PREFERRED EMBODIMENT

Figure 1:
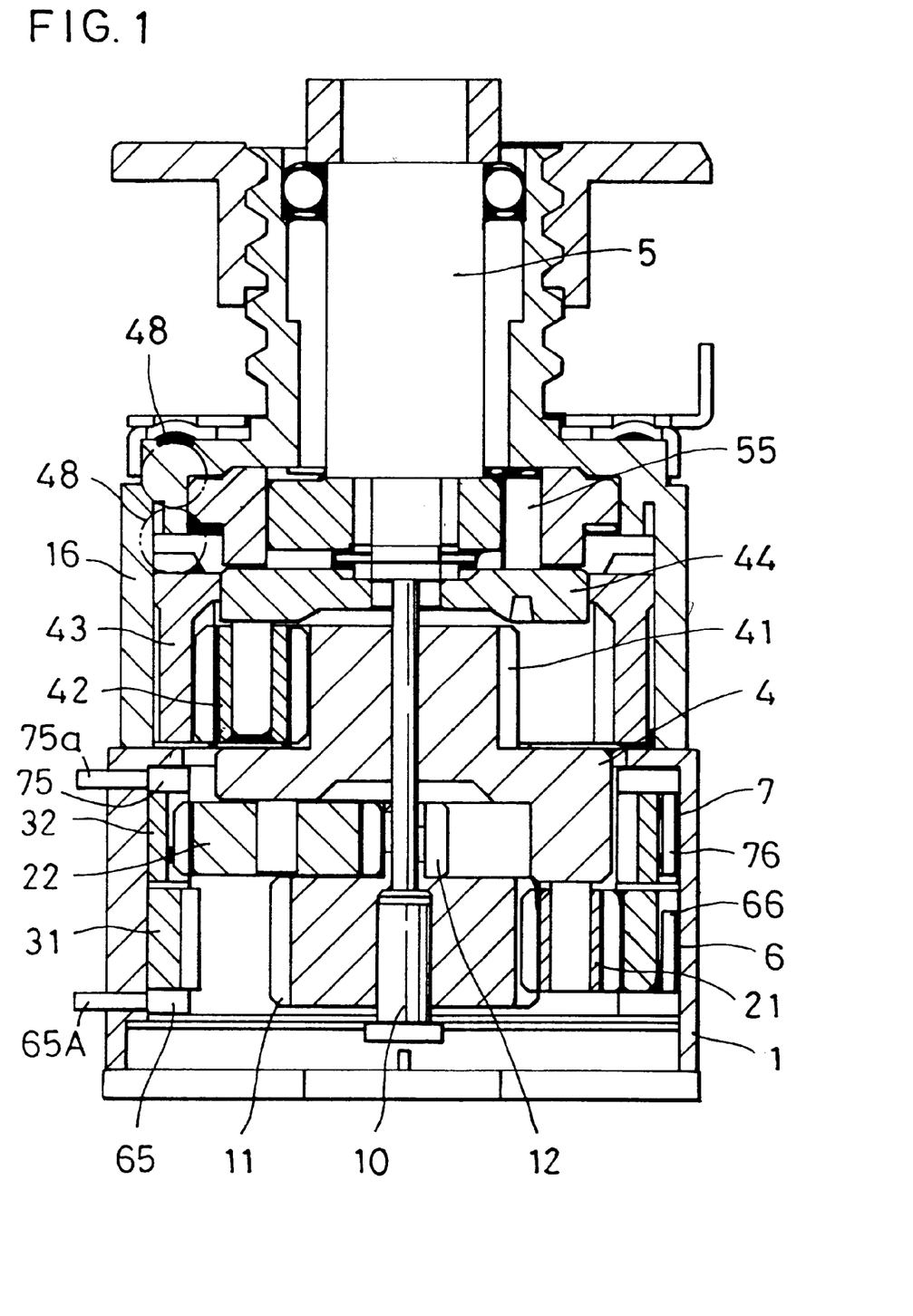
FIG. 1 is a vertically sectioned view showing an embodiment of the planetary transmission according to the present invention.

Referring in detail to an embodiment of the planetary transmission as shown in FIG. 1 for use in such motor-driven tools as a power drill, power screw driver and so on, a gear case 1 accommodates therein an input shaft 10 disposed on an aperture side at one axial end part, to which shaft 10 two sun gears 11 and 12 different in the number of teeth are secured as arranged side by side in axial direction of the shaft 10, and these sun gears 11 and 12 respectively comprise each of two sets 21 and 22 of a plurality, for example, three of planet gears (in FIG. 1 only one of them is shown), which gear sets 21 and 22 are mutually different in the number of teeth and are supported commonly by a carrier 4. The planet gears 21 are supported around the sun gear 11 at equal intervals, while the planet gears 22 are supported around the sun gear 12 also at equal intervals, and both sets of the planet gears 21 and 22 are arranged respectively for individual rotation and for an identical revolution.

Further, the set of planet gears 21 are in mesh with a ring gear 31 disposed coaxial with the input shaft 10, and the other set of planet gears 22 are in mesh with a further ring gear 32 disposed also coaxial with the input shaft 10. Between these two ring gears 31 and 32 disposed side by side in the axial direction of the input shaft 10 and the gear case 1 externally circumferentially disposed, there are interposed two one-way clutches 6 and 7 (only one of them is shown in FIG. 1) to respectively circumferentially oppose each of the ring gears 31 and 32.

Figure 2:
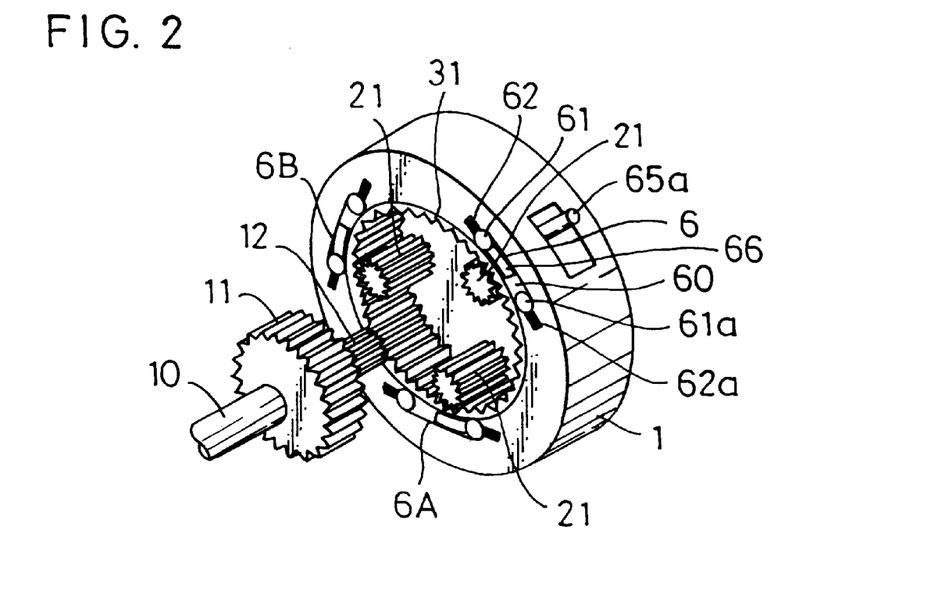
FIG. 2 is a perspective view as partly disassembled of one of the one-way clutches employed in the transmission of FIG. 1.
Figure 3:
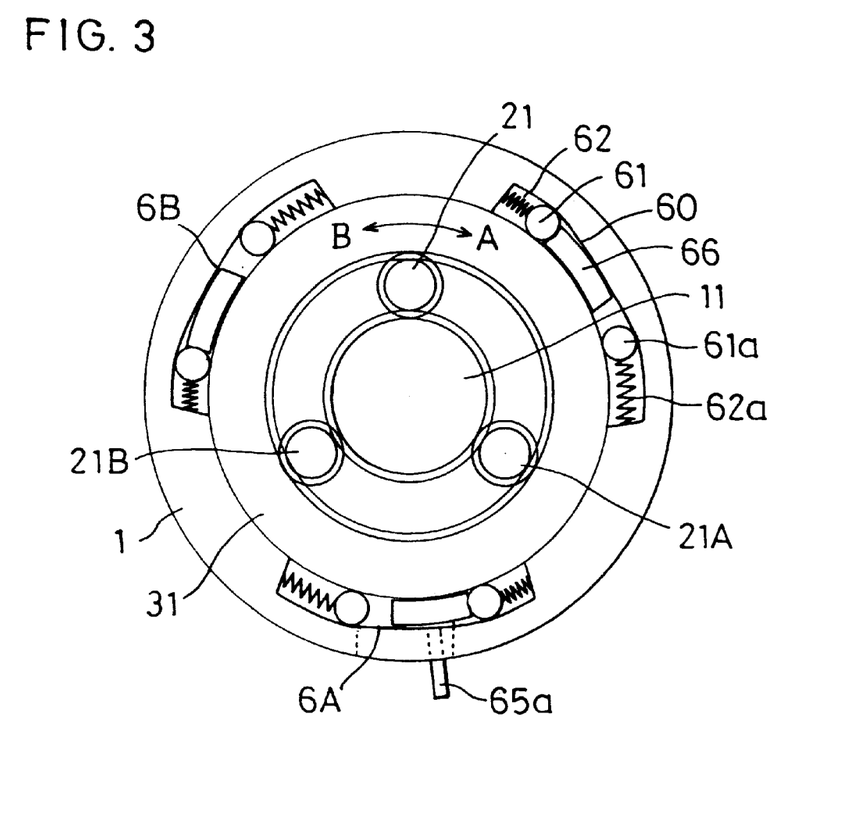
FIGS. 3 and 4 are explanatory views for the operation of one of the one-way clutches in the transmission of FIG. 1.
Figure 4:
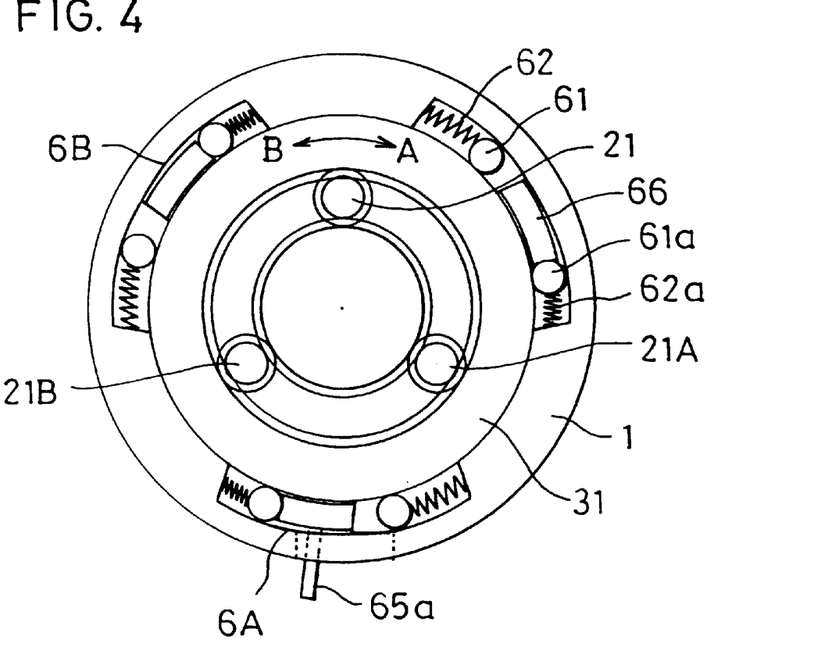

Referring more specifically to them with reference to FIGS. 2 to 4, in which a first planetary gear unit comprising the sun gear 11, planet gears 21, ring gear 31 and one-way clutch 6 is shown, and the one-way clutch 6 includes, for example, three clutch elements 6, 6A and 6B are respectively formed by the gear case 1 as an outer race and by the ring gear 31 as an inner race. Since these one-way clutch elements 6, 6A and 6B are of mutually identical structure, only one 6 shall be explained. The one-way clutch 6 is arranged in a freewheeler type with rollers or balls 61 and 61a disposed in each of wedge-shaped corner spaces 60 of circumferentially defined grooves between both races 1 and 31, the wedge-shaped corner spaces 60 being respectively narrowered in mutually inward direction, and each of driving members 66 projected from a change-over ring 65 having an actuating lever 65a is inserted in each groove between the rollers or balls 61 in both side corner spaces 60, so that the driving member 66 will urge the roller or ball 61 on either side of the member 66 in each groove with the change-over ring 65 rotated with respect to the gear case 1 through the actuating lever 65a of the ring 65 exposed to the exterior of the case 1, and the direction in which the ring gear 31 as the inner race is rotatable can be changed over.

That is, in a state where the drive member 66 urges, as shown in FIG. 3, one side roller or ball 61 in one circumferential direction B, the other side roller or ball 61a is resiliently biased by a spring 62a circumferentially towards the center in the groove, so that the ring gear 31 is rendered rotatable in the other circumferential direction A whereas the rotation of the ring gear 31 in the direction B is blocked. When the driving member 66 is shifted to the other side to urge, as in FIG. 4, the other righthand side roller or ball 61 in rightward direction in the direction A, then the ring gear 31 is made rotatable reversely in the direction B and the rotation of the ring gear 31 in the direction A can be blocked. In other words, the rotatable direction of the one-way clutch 6 can be changed over by the operation of the change-over ring 65 in the circumferential directions, and the clutch 6 can be used as a bilateral one-way clutch, as will be readily appreciated.

Figure 5:
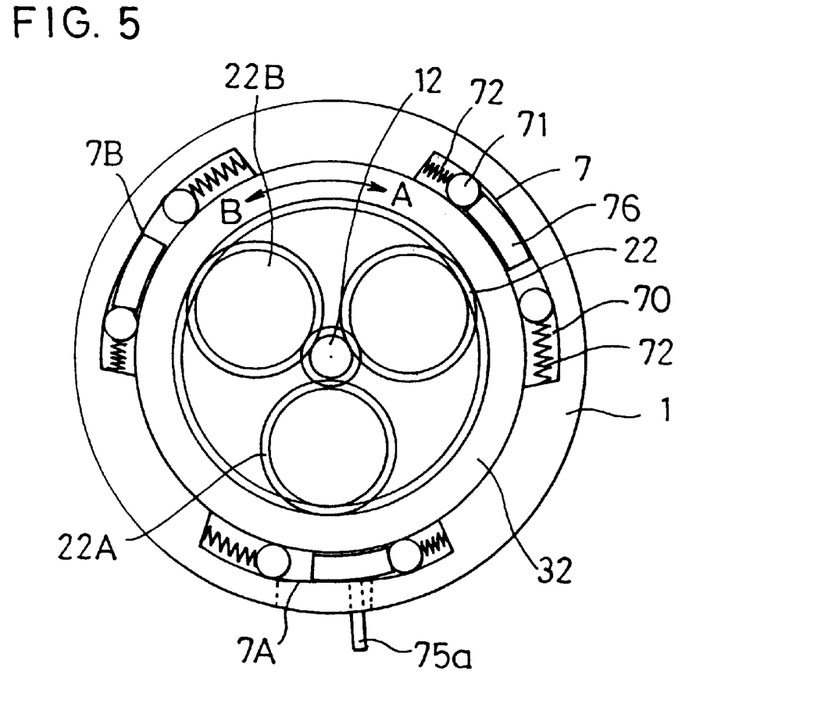
FIG. 5 is an explanatory view for the operation of the other of the one-way clutches in the transmission of FIG. 1.

Further, in FIG. 5, a second planetary gear unit comprising the sun gear 12, planet gears 22, ring gear 32 and one-way clutch which includes clutch elements 7, 7A and 7B is shown, and the one-way clutch 7 cooperates with the gear case 1 as an outer race and the ring gear 32 as the inner race, and arranged in the freewheeler type with rollers or balls 71 disposed in the wedge-shaped corner spaces 70 of respective grooves defined circumferentially between the gear case 1 and the ring gear 32, so as to form also the bilateral one-way clutch, the rotatable direction of which can be changed over in accordance with the position of the projected driving member 76 of the change-over ring 75 having the actuating lever 75a.

The carrier 4 supporting both planet gears 21 and 22 is provided integrally with a sun gear 41, and the rotation of this sun gear 41 is transmitted to a carrier 44 supporting a planet gear 42 which is in mesh with the sun gear 41 and ring gear 43. Further, the rotation of this carrier 44 is transmitted through an automatic lock mechanism 55 to an output shaft 5 which is projected out of a gear case 16 in which the gears 41–44 and the mechanism 55 are disposed. The automatic lock mechanism 55 functions to automatically lock the output shaft 5 with respect to the gear case 16 upon stopping of associated motor and to automatically release the lock upon rotating the motor. The above ring gear 43 is also provided rotatable and constitutes a torque limiter which separates the sun gear 41 from the output shaft 5 when a load torque exceeds a predetermined value, by causing balls 48 to engage with the ring gear 43 by means of a biasing force of a clutch spring.

Now, provided that the one-way clutch 6 is blocking the rotation of the ring gear 31 in the direction of arrow B in FIG. 3 and the one-way clutch 7 is blocking the rotation of the ring gear 32 in the direction B of an arrow in FIG. 5, the input shaft 10 is rotated in the direction A of the arrow by means of a motor, this rotation output is transmitted through the planet gear 21 in mesh with the ring gear 31 of which the rotation in direction B is blocked, whereupon which the ring gear 32 is caused to idle in a direction A, and this idling is made to be in a direction A in which the rotation is enabled by the one-way clutch 7.

Further, when the one-way clutch 6 is changed over by lever 65a from the state shown in FIG. 3 to the state of FIG.

4 with the change-over ring 65 operated, that is, as the direction in which the ring gear 31 is made rotatable is changed over, the ring gear 31 starts rotating in the direction B in the drawing. If a load is applied to the output shaft 5 to oppose rotation thereof in direction A, the ring gear 32 tends to rotate in a direction B reverse to that in which the gear 32 has been rotated so far, but this rotation tendency in direction B is blocked by the one-way clutch 7, so that a rotary power is transmitted through the planet gear 22 in mesh with the ring gear 32 to the carrier 4 and eventually to the output shaft 5. Since the sun gear 12 has a smaller number of teeth than the sun gear 11 and the planet gear 22 has a larger number of teeth than the planet gear 21, the low-torque high-speed rotating state is to be changed over in smooth manner to the high-torque low-speed rotating state. Further, this speed change enables a single directional rotation of, for example, the ring gear 31 by utilizing the bilateral one-way clutches 6 and 7, and can be quickly performed by restricting the rotation in one direction of the ring gear 32. Consequently, there are no members which collide with each other even upon changing over the rotating direction of the ring gears 31 and 32, and a smooth and noiseless speed change operation can be realized even when the speed is changed during the operation of the motor-driven tool or the like. The shift of the operation from the high-torque low-speed rotating state to the low-torque high-speed rotating state can be executed by restoring the change-over ring 65 to the previous position, even upon which no shock is caused to occur, and a smooth execution of the shift can be attained even upon actuation during the stoppage of the motor since any meshing part causing any collision does not exist.

The foregoing change-over ring 65 or 75 for the speed change may be actuated without relying on manual operation but automatically by a provision of, for example, a load detecting means functioning to detect revolution number of the motor for actuation of the actuating lever of the change-over ring 65 or 75 in response to an output of the load detecting means, according to which an automatic speed change responsive to an increase in the load can be realized.

It is also possible to reverse the rotating direction of the motor with the direction in which the rotation of the one-way clutches 6 and 7 is enabled is reversed to that shown in FIGS. 3 and 5, only with a difference in the reversed rotating direction of the output shaft 5, by changing over the direction of the enabled rotation of the one-way clutch 6 in accordance with the increase in the load, resulting in the same speed as in the foregoing. And as the foregoing embodiment, by employing the one-way clutch 7 of the bilateral type, a smooth operation in correspondence to normal directional and reverse directional rotation is made possible. Further, when the motor is arranged for rotation in one direction, the one-way clutch 7 which is unable to be changed over in respect of the direction of blocking the rotation may be employed.

According to the present invention as has been described, the blocking of rotation by means of the one-way clutch causes no collision to occur even upon restriction of rotation of the ring gear for the speed change, the releasing of the rotation blocking for the speed change can be easily attained by releasing the rotation stopping of the one-way clutch, and the restoration of the state of blocking the rotation again can be executed in smooth manner because of the structure of the one-way clutch allowing the rotation stopping to be easily releasable, for sufficiently smooth realization of the bilateral change over, that is, from the low-torque high-speed rotation to the high-torque low-speed rotation and from the high-torque low-speed rotation to the low-torque high-speed rotation of the speed change, as will be readily appreciated.

Figures 6A, 6B:
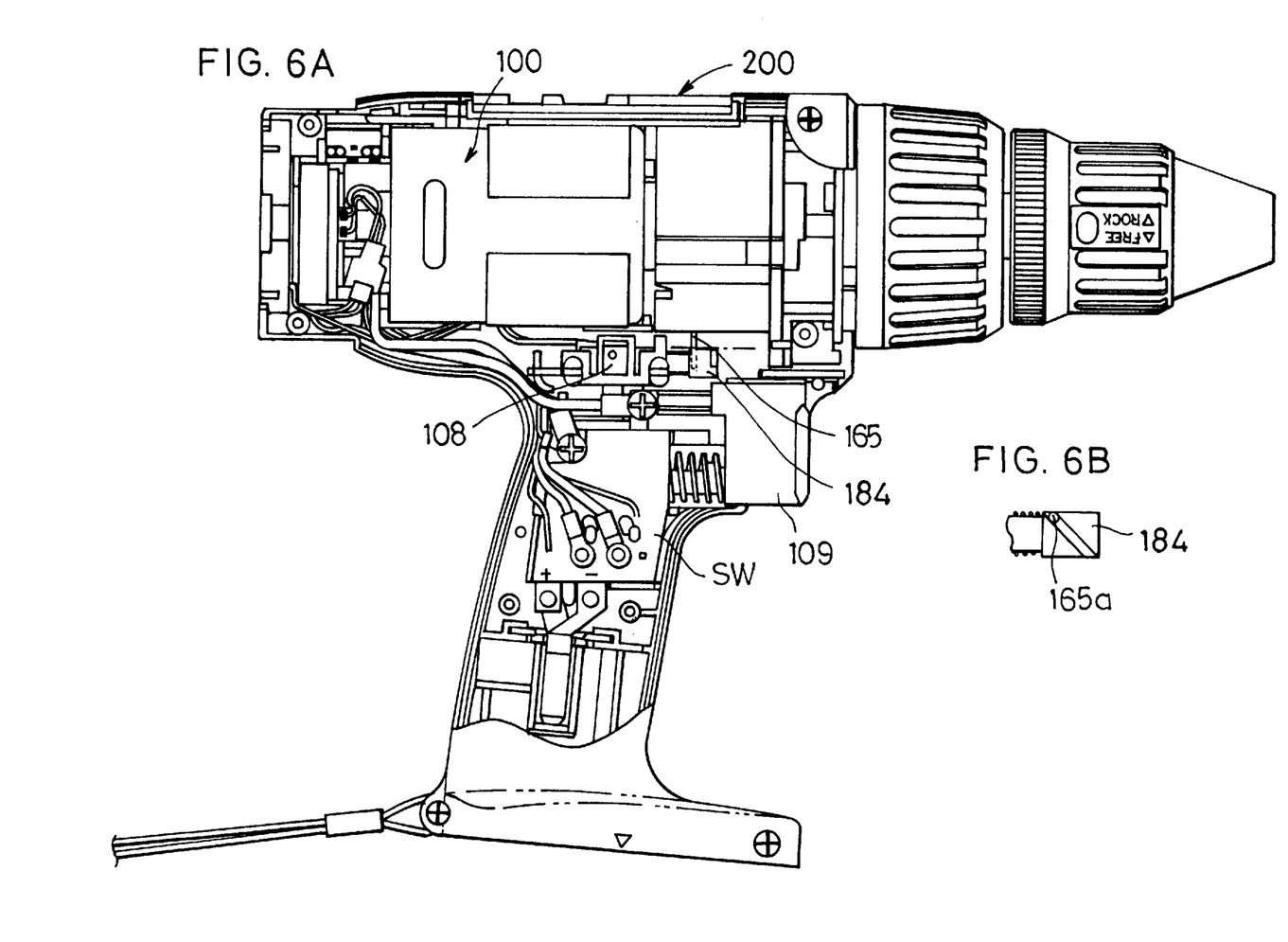
FIGS. 6A and 6B show in side views partly sectioned a motor-driven screw driver embodying another embodiment of the present invention.

Another embodiment of the planetary transmission according to the present invention is shown in FIGS. 6 to 9. In FIG. 6, a motor-driven screw driver 200 employing the transmission in another embodiment of the present invention is shown. In this embodiment, the one-way clutch on the side of the low-torque high-speed rotation is made releasable in the rotation stopping, while the other clutch on the high-torque low-speed rotation side is of an ordinary one-way clutch of which rotation stopping cannot be released, and the arrangement is so made that an automatic speed change responsive to increments in the load of the motor-driven screw driver.

In the present embodiment, too, similar to the foregoing embodiment, there are interposed two one-way clutches 106 and 107 between the two ring gears 131 and 132 disposed side by side in the axial direction of the input shaft 10 and the gear case 1 externally circumferentially disposed to respectively circumferentially oppose each of the ring gears 31 and 32.

Figure 7:
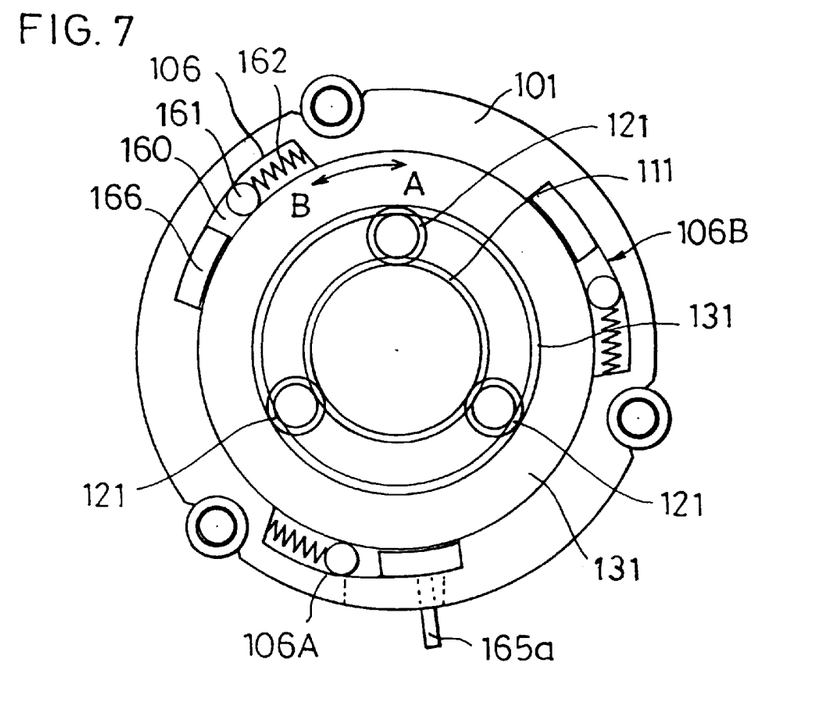
FIG. 7 is an explanatory view for the operation of one of the one-way clutches in the transmission employed in such motor-driven tools as the motor-driven screw driver of FIG. 6.

As shown in FIG. 7, in this case, each of the one-way clutches 106, 106A and 106B is formed by the gear case 101 as an outer race and by the ring gear 131 as an inner race, to be in a free-wheel type with rollers or balls 161 disposed in each of wedge-shaped corner spaces 160 of circumferentially defined grooves between both races 101 and 131, the wedge-shaped corner spaces 160 being respectively narrowered in mutually inward direction, and each of driving members 166 projected from a change-over ring is inserted in each groove between the rollers or balls 161 in both side corner spaces 160, so that the driving member 166 will urge the roller or ball 161 on either side of the member 166 in each groove with the change-over ring rotated and displaced with resepct to the gear case 1 in the same manner as in the foregoing embodiment, the rotation of the ring gear 131 as the inner race can be blocked.

That is, in a state where the drive member 166 urges, as shown in FIG. 7, one roller or ball 161 is resiliently biased by a spring 162 circumferentially towards the center in the groove, so that the ring gear 131 is rendered rotatable in the direction A whereas the rotation of the ring gear 131 in the direction B is blocked. When the driving member 166 is shifted to the other side to urge, as in FIG. 9, the roller or ball 161 in the direction A, then the blocking of rotation of the ring gear 131 in the direction B is released, and the rotation of the ring gear 131 in both directions A and B is enabled.

Figure 8:
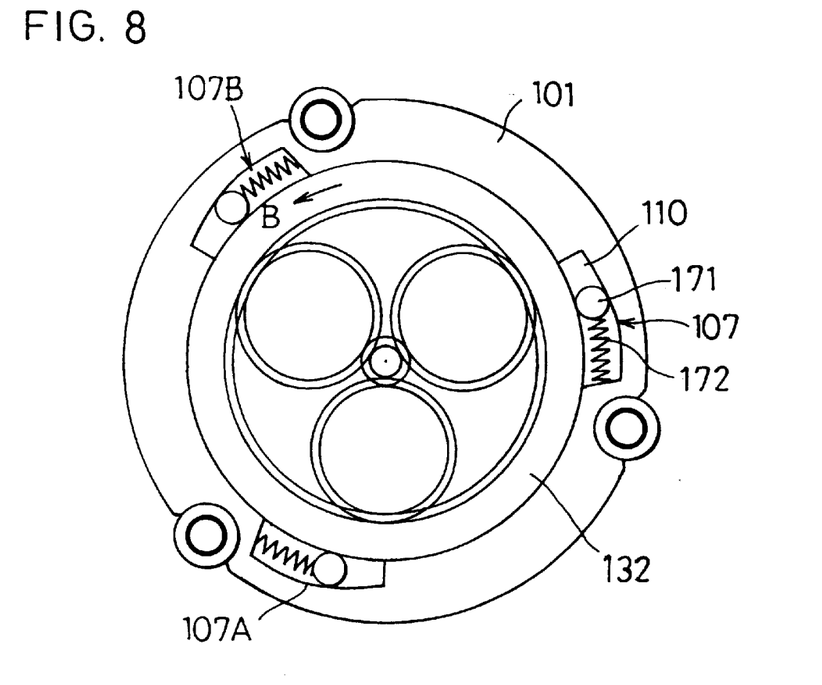
FIG. 8 is an explanatory view for the operation of the other one-way clutch in the transmission employed in the tool shown in FIG. 6.

Further, as shown in FIG. 8, the one-way clutch 107 is also formed by the gear case 101 as an outer race and the ring gear 132 as the inner race, and arranged in the free-wheel type with rollers or balls 171 disposed in the wedge-shaped corner spaces 170 of respective grooves defined circumferentially between the gear case 101 and the ring gear 132. In this case, the carrier supporting both planet gears 121 and 122 or their interlinking arrangement with the ring gear is the same as that in the foregoing embodiment.

Now, provided that the one-way clutch 106 blocks the rotation of the ring gear 131 in the direction of arrow B in FIG. 7 and the one-way clutch 107 is blocking the rotation of the ring gear 132 in the direction of arrow B in FIG. 8, the input shaft, corresponding to the member 10 in the embodiment of FIG. 1, is rotated in a predetermined direction by means of a motor, this rotation output is transmitted through the planet gear 121 in mesh with the ring gear 131 of which the rotation is blocked, upon which the ring gear 132 is caused to make an idling in a direction reverse to the output shaft, and this idling is made to be in a direction in which the rotation is enabled by the one-way clutch 107.

Here, the motor 100 is provided with a revolution detecting means or the like (not shown) which per se has been known, so that the load can be detected in response to any increase in the load, and an electromagnetic drive section 108 is provided to be actuated in accordance with a detection value of the revolution detecting means. This electromagnetic drive section 108 is provided so as to project a plunger 184 upon being actuated, which plunger 184 is provided with a groove slanted with respect to projecting and retracting direction of the plunger, and the operating lever 165*a* of the change-over ring is engaged in the groove of the plunger, and the actuation of the electromagnetic drive section 108 is transmitted to the operating lever 165*a*. The change-over ring is driven as the operating lever 165*a* is actuated, and eventually the one-way clutch 106 is changed over to be released from its fixed state.

Figure 9:
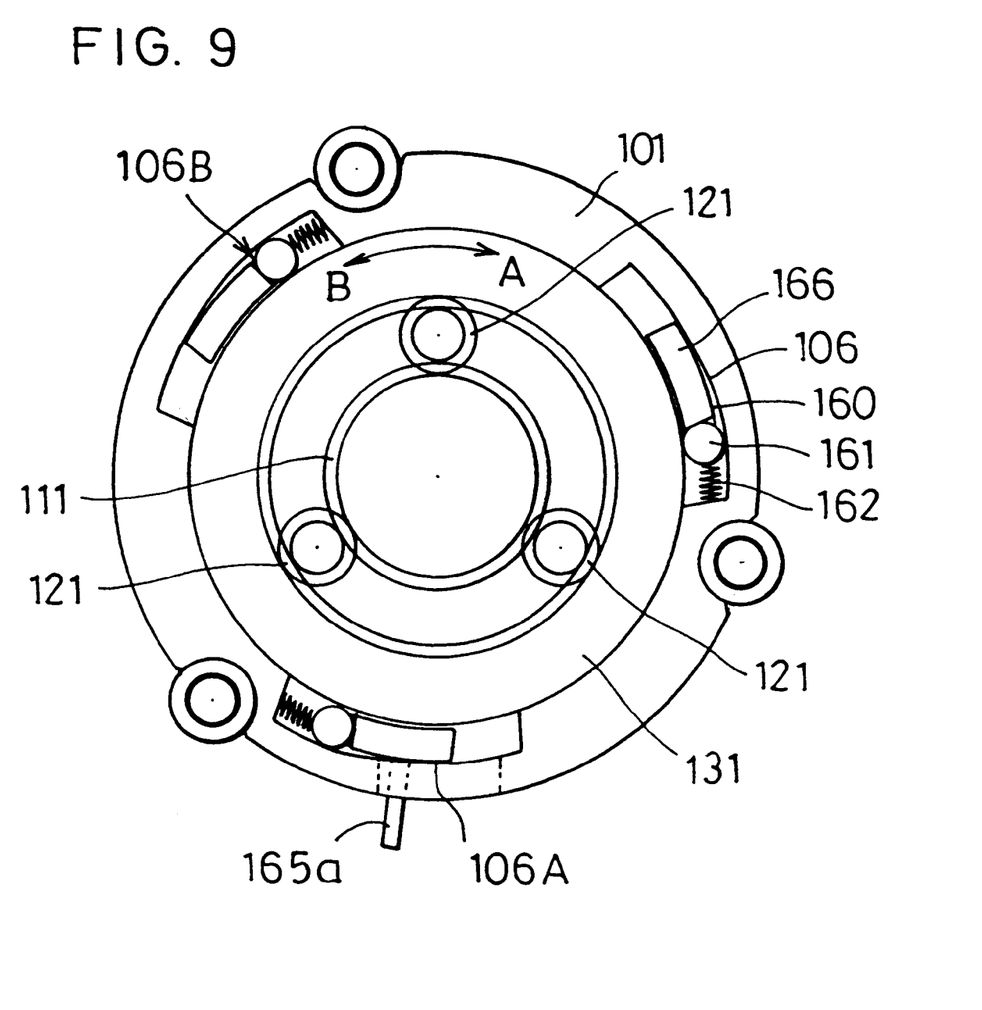
FIG. 9 is an explanatory view for the operation of one of the one-way clutches in the transmission employed in the tool of FIG. 6.

In response to the increase in the load detected by the revolution detecting means or the like of the motor 100, the electromagnetic drive section 108 is actuated, the plunger 184 being biased by a spring load of a spring 185 is projected to drive the operating lever 165*a* of the change-over ring engaged in the slanted or tapered groove of the plunger 184, the one-way clutch 106 is thereby changed over from the state of FIG. 7 to the state of FIG. 9, that is, the fixation of the ring gear 131 by the one-way clutch 106 is released, and the ring gear 131 starts rotating in the direction B. If a load is being applied to the side of the output shaft at this time, the ring gear 132 is apt to rotate in the direction B reverse to that in A in which the gear has been rotated so far, but this rotation is in the direction of rotation blocked by the one-way clutch 107, so that a rotary power is transmitted through the planet gear 122 in mesh with the ring gear 132 to the carrier and eventually to the output shaft.

The low-torque high-speed rotating state can be changed over in smooth manner to the high-torque low-speed rotating state, and the arrangement for restricting any collision upon changing over the rotating direction of the ring gears 131 and 132 will be the same as that in the foregoing embodiment.

Figure 10A:
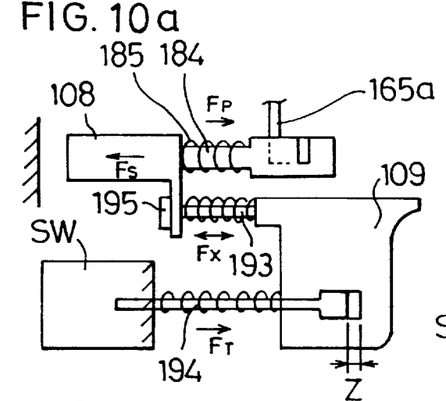
FIGS. 10a to 10c and FIGS. 11a and 11b are explanatory views respectively for further different aspects of the operation of the transmission employed in the tool of FIG. 6.
Figure 10B:
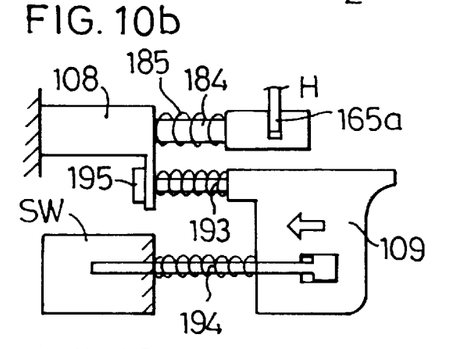
Figure 10C:
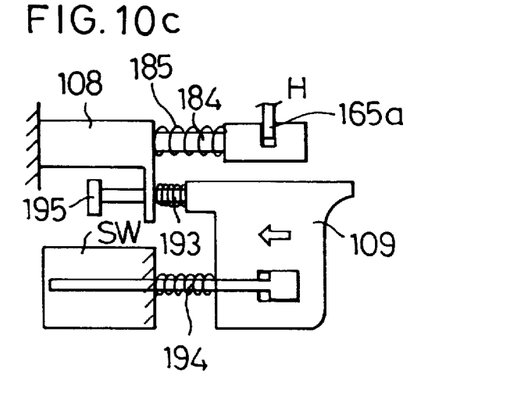
Figure 11A:
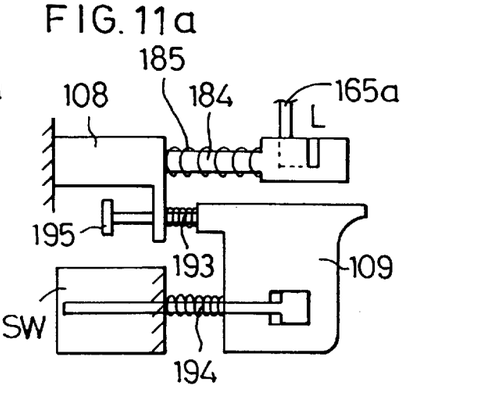
Figure 11B:
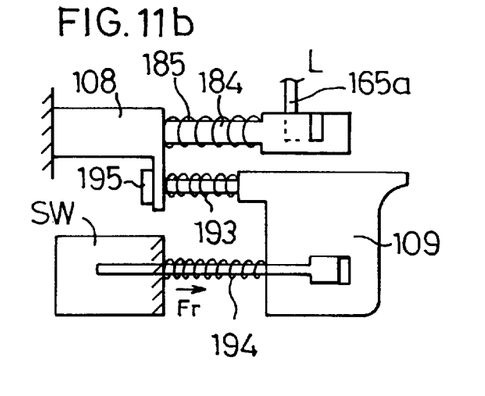

Next, the operation of the electromagnetic drive section 108 of a keep-solenoid, in particular, its resetting operation shall be referred to with reference to FIGS. 10 and 11. In this case, the electromagnetic drive section 108 is provided for projecting the plunger 184 upon increment in the load detected by the revolution detecting means or the like of the driving motor 100, and for resetting the same as interlocked to the operation of a trigger switch 109. Referring thereto more specifically, the electromagnetic drive section 108 is disposed to be slidable in the same direction as the operating direction of the trigger switch 109, so that the drive section 108 will be at an advanced position as drawn by the trigger switch 109 as shown in FIG. 10(*a*) in the state where the motor 100 is OFF, that is, the trigger switch 109 is not pulled, upon which the plunger 184 is in its retracted state as attracted by a permanent magnet of the drive section 108. The driving member 166 is urging the roller or ball 161 into its position at the widest part of the wedge-shaped space 160 against the resiliency of the spring 162, as shown in FIG. 9, and the ring gear 131 is in the released state from the blocking by means of the one-way clutch 106 to be set in a high-torque low-speed rotating state L.

As the trigger switch 109 in this position is pulled by the operator in a direction of an arrow as shown in FIG. 10*b*, the electromagnetic drive section 108 is biased by a spring 193 disposed between the section 108 and the switch 109 in retracting direction, as seen in FIG. 10*c*. Accompanying this retracting motion, the plunger 184 is also retracted, whereby the change-over is rotated to displace the operating lever 165*a* to a position shown in FIG. 7, and the ring gear 131 is blocked from rotating in the direction B by the one-way clutch 106 to be reset in the low-torque high-speed rotating state H. While the trigger switch 109 pulled actuates a switch unit SW to start supplying the power to the driving motor 100, an interposition of a play z between the trigger switch 109 and the switch unit SW renders the power supply to the motor 100 to be started after the setting in the low-torque high-speed rotating state H.

As the electromagnetic drive section 108 is excited in a direction cancelling the attraction of the permanent magnet in the section 108 in response to a further increment in the load, as shown in FIG. 11*a*, the plunger 184 is projected to change the transmission over to the high-torque low-speed rotating state L. As this operation terminates and the operator leaves the finger from the trigger switch 109, biasing forces Fr and Fx of a resetting spring 194 and another spring 193 cause the trigger switch 109 to be reset, the motor 100 is thereby stopped. Then, the electromagnetic drive section 108 is drawn by a hook 195 of the trigger switch 109 to advance, the plunger 184 is retracted by the advancing drive section 108 into the main body having the coil of the section 108, and the state shown in FIG. 10*a* is restored. Accompanying the resetting of the trigger switch 109, the electromagnetic drive section 108 is also reset, and the resetting of the transmission from the high-torque low-speed rotating state L to the low-torque high-speed rotating state H can be realized in smooth manner, accompanying the resetting of the trigger switch 109.

Other arrangements in the embodiment described with reference to FIGS. 6 to 11 are the same as those in the foregoing embodiment of FIGS. 1 to 5, and the same function and effect can be realized.

What is claimed is:

1. A planetary transmission comprising:

a gear case;

an input shaft rotatably mounted at a first axial end of the gear case;

a first planet gear unit defining a first reduction ratio, and including a first sun gear mounted coaxially on the input shaft for rotation therewith, a first set of planet gears disposed around the first sun gear in mesh therewith, and a first rotatable ring gear in mesh circumferentially with the first set of planet gears;

a second planet gear unit defining a second reduction ratio, and including a second sun gear mounted coaxially on the input shaft and operably connected with the first sun gear for common rotation therewith, a second set of planet gears disposed around the second sun gear in mesh therewith, and a second rotatable ring gear in mesh circumferentially with the second set of planet gears;

a common rotatable carrier carrying the first and second sets of planet gears of the first and second planet gear units;

an output shaft rotatably mounted at a second axial end of the gear case;

the first and second ring gears supported for rotation independently of each other and with respect to an inner wall of the gear case; and change-over means for changing over the reduction ratio of the rotation of the input shaft transmitted to the output shaft through one of the first and second planet gear units, the change-over means including means for blocking rotation of the first and second ring gears at least in a first direction while allowing rotation of the first and second ring gears in a second direction, and means for releasing the blocking means with respect to only the first ring gear to allow rotation of the first ring gear at least in the first direction while maintaining the blocking of the second ring gear in the first direction.

2. The transmission according to claim 1 wherein the change-over means comprises first and second one-way clutches operably connected to the first and second ring gears respectively; the first one-way clutch being reversible whereby the change-over means is adjustable between a first state in which the first and second one-way clutches permit rotation of both of the first and second ring gears only in the first direction, for transmitting rotation of the input shaft in the first direction at the first reduction ratio to the output shaft to rotate the output shaft in the first direction while the first ring gear is stationary and the second ring gear idles in the first direction, and a second state in which the first one way clutch permits rotation of the first ring gear only in the second direction and the second one-way clutch permits rotation of the second ring gear only in the first direction, for transmitting rotation of the input shaft in the first direction at the second reduction ratio to the output shaft while the first ring gear idles in the second direction and the second ring gear is stationary.

3. The transmission according to claim 2 wherein said second one-way clutch is reversible.

4. The transmission according to claim 1 wherein the second reduction ratio is higher than the first reduction ration.

5. A planetary transmission comprising:

a gear case;

an input shaft rotatably mounted at a first axial end of the gear case;

a first planet gear unit defining a first reduction ratio, and including a first sun gear mounted coaxially on the input shaft for rotation therewith, a first set of planet gears disposed around the first sun gear in mesh therewith, and a first rotatable ring gear in mesh circumferentially with the first set of planet gears;

a second planet gear unit defining a second reduction ratio, and including a second sun gear mounted coaxially on the input shaft and operably connected with the first sun gear for common rotation therewith, a second set of planet gears disposed around the second sun gear in mesh therewith, and a second rotatable ring gear in mesh circumferentially with the second set of planet gears;

a common rotatable carrier carrying the first and second sets of planet gears of the first and second planet gear units;

an output shaft rotatably mounted at a second axial end of the gear case;

the first and second ring gears supported for rotation independently of each other and with respect to an inner wall of the gear case;

a first one-way clutch connected to the first ring gear for permitting one-way rotation of the first ring gear; and a second one-way clutch connected to the second ring gear for permitting one-way rotation of the second ring gear;

at least the first one-way clutch being reversible for permitting the first ring gear to rotate selectively in either direction.

* * * * *